United States Patent

[11] 3,592,318

| [72] | Inventors | Glen E. Lyons;<br>Douglas J. Lamb; Paul T. Howse, Jr., all of Pensacola, Fla. |
|---|---|---|
| [21] | Appl. No. | 784,560 |
| [22] | Filed | Dec. 18, 1968 |
| [45] | Patented | July 13, 1971 |
| [73] | Assignee | Monsanto Company<br>St. Louis, Mo. |

[54] FLUID PRESSURE-OPERATED OVERLOAD CLUTCH AND BRAKE
9 Claims, 6 Drawing Figs.

[52] U.S. Cl. .................................................. 192/18,
    192/56, 192/91
[51] Int. Cl. ......................................................F16d 67/04,
    F16d 43/20
[50] Field of Search........................................ 192/56 F,
    12 A, 18 A, 16, 144, 150 (Cursory)

[56] References Cited
UNITED STATES PATENTS

| 3,298,481 | 1/1967 | Schaedler et al. .............. | 192/150 |
| 3,205,986 | 9/1965 | Kramer ......................... | 192/56 F |
| 3,298,488 | 1/1967 | McDonald...................... | 192/56 F |
| 3,360,087 | 12/1967 | Hilpert .......................... | 192/56 F |
| 3,419,117 | 12/1968 | Conway......................... | 192/56 F X |
| 3,442,362 | 5/1969 | Bangerter...................... | 192/150 |

*Primary Examiner*—Benjamin W. Wyche
*Attorneys*—Alexander Kozel, Stanley M. Tarter and Roy P. Wymbs

ABSTRACT: A clutch connected between drive and driven shafts and linked to an electropneumatic control unit to effect an automatic, positive disengagement of clutch members and a braking of the driven shaft when a predetermined drive shaft overload torque is sensed by the clutch. The clutch combines frictional and gear-tooth clutch components arranged to operate cooperatively and sequentially.

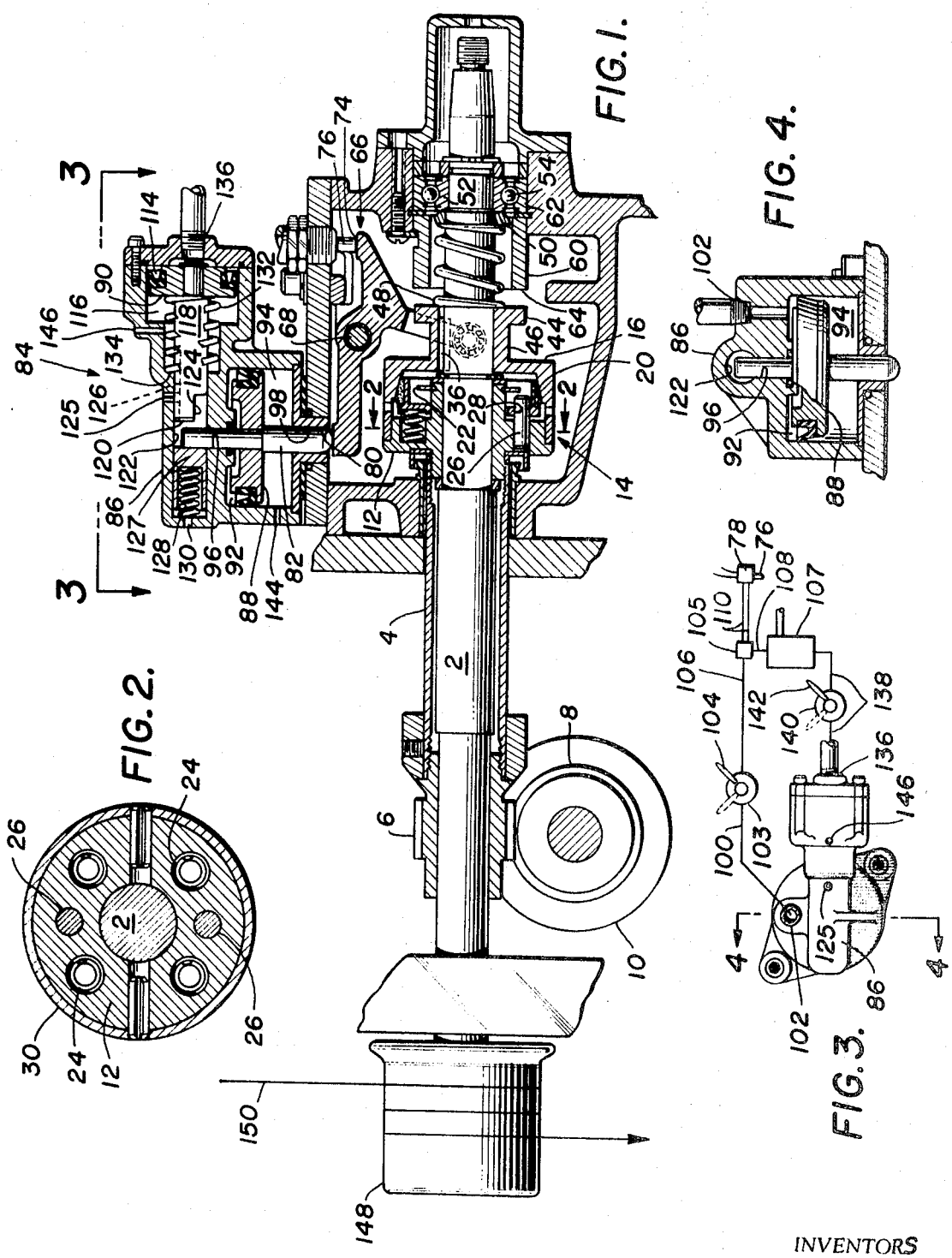

FLUID PRESSURE-OPERATED OVERLOAD CLUTCH AND BRAKE

BACKGROUND OF THE INVENTION

In the textile industry, it is customary to use driven feed and draw rolls in the processing of filaments and yarns. For example, in stretching or drawing nylon yarns, a yarn is forwarded from a driven feed roll to and around a draw roll driven at a higher relative speed so that the yarn is stretched therebetween. It is not uncommon in such processing for yarn to tangle or ravel around any one of the rolls and, unless the roll is quickly stopped, the yarn continues to ravel and collect on the roll causing the drive mechanism to eventually seize and lock up. As a consequence, machinery may be damaged and a large quantity of yarn may be wasted.

It is an object of the invention to provide a clutch assembly that senses a predetermined increase in torque load transmitted thereto and acts responsively to slip and to actuate an electropneumatic control unit to effect a rapid, uncoupling of the clutch assembly and a positive braking of a driven shaft.

Another object is to provide a clutch having both gear-tooth and frictional clutching elements.

BRIEF DESCRIPTION OF THE INVENTION

The invention comprises a clutch drive member connected to a drive shaft and a clutch driven member connected to a driven shaft. The clutch driven member is spring-biased toward the clutch drive member to provide positive meshed gear-tooth and frictional engagement of the clutch members. Responsively to the clutch driven member sensing a predetermined torque load and being forced to slip displacingly a predetermined incremental distance out of positive gear-tooth engagement with the clutch drive member and while being frictionally engaged therewith, a pneumatic control unit is actuated through a pivotal lever linkage and a microswitch to rapidly shift the clutch driven member completely out of gear-tooth and frictional engagement with the clutch drive member and to brake the driven shaft.

To effect a clutch engagement, the pneumatic control unit is actuated to release the clutch driven member from its locked and disengaged position permitting the clutch driven member to be spring-biased, sequentially, into slipping frictional and positive gear-tooth engagement with the clutch drive member.

BRIEF DESCRIPTION OF THE DRAWING

In the drawings:

FIG. 1 is a cross section view of the overload clutch device of the invention,

FIG. 2 is a cross section view taken on line 2–2 of FIG. 1 and through the clutch drive member 12 of the overload clutch device, FIG. 3 is a plan view of the pneumatic control unit of the overload clutch device with a schematic illustration of the pneumatic and electrical circuit associated therewith, FIG. 4 is a cross section view taken through 4–4 of FIG. 3.

DESCRIPTION OF A PREFERRED EMBODIMENT

Figure 5:
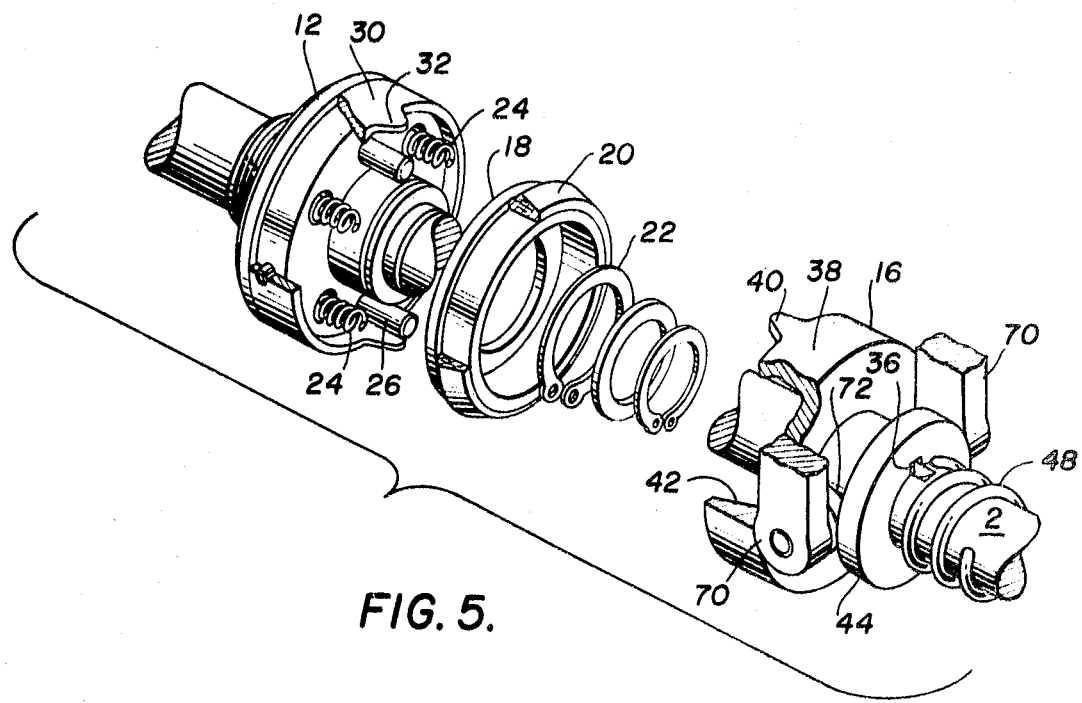
FIG. 5 is a perspective, exploded view of the clutch members of the overload clutch device.
Figure 6:
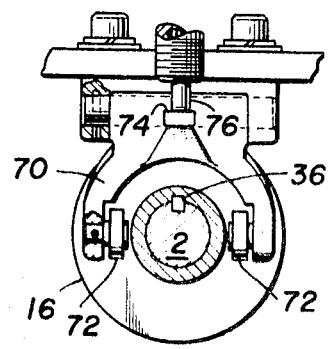
FIG. 6 is an end elevation view illustrating the lever and yoke arrangement of the overload clutch device.

Referring to the drawings, the overload clutch device as illustrated in FIGS. 1—6, comprises a driven shaft 2 and a tubular drive shaft 4 mounted concentrically and rotatably around a portion of the driven shaft 2. One end of drive shaft 4 is journaled for rotation on driven shaft 2 and is provided with a gear member 6 that engages with a drive gear 8 driven conventionally by a motor 10. At its opposite end, drive shaft 4 is connected to a clutch drive member 12 of a slip-dog clutch assembly 14 including a cooperating clutch driven member 16.

The clutch drive member 12 is rotatably journaled on driven shaft 2 and is suitably retained thereon by retainer and spacer means. An axially displaceable slide ring 18 is mounted slidably on clutch drive member 12. Slide ring 18 has an annular, friction clutch lining 20 mounted therearound, and is spring-biased against a retainer ring 22 by a plurality of springs 24 compressingly caged between slide ring 18 and clutch drive member 12. Slide ring 18 is guided to slide axially on clutch drive member 12 by a plurality of pins 26 pressed in clutch drive member 12 and extending in slidable engagement into guide bores 28 provided in slide ring 18. Slide ring 18 and clutch drive member 12 rotate together.

A gear or dog ring 30 having a plurality of spaced gear-teeth or dogs 32 is suitably retained concentrically about the periphery of clutch drive member 12. Dogs 32 are located adjacent to friction lining 20.

Clutch driven member 16 is provided with a keyway that engages with a key 36 to provide axial sliding displacement thereon and fixed rotation therewith. Clutch driven member 16 also has a gear or dog ring 38 formed with a plurality of gear or dog teeth 40 at one end thereof facing dogs 32 of ring 30 to mesh therewith. Dog ring 38 has an annular friction surface 42 formed complementary to the outer surface of friction lining 20 to engage frictionally therewith. Preferably, surfaces 20 and 42 are tapered to provide effective frictional engagement. Opposite dog ring 38, clutch driven member 16 has a circumferential flange 44 connected to dog ring 38 by an intermediate sleeve portion 46.

A helical spring 48, mounted about driven shaft 2 and abutting against flange 44, is compressed between flange 44 and a thrust collar or bearing 50 mounted about driven shaft 2. Thrust bearing 50 abuts against the inner race 52 of a ball bearing 54 that is suitably retained on driven shaft 2 by conventional spacers and retainers.

A brake sleeve 60 concentrically and spacingly surrounds helical spring 48 and is suitably secured by a screw to abut at its one end against a retainer ring bearing against the outer race 62 of bearing 54 while its opposite free end serves as a brake element 64. Brake sleeve 60 is, preferably, formed of a soft metal, e.g. bronze, to act as a brake material. A brake lining may be attached to the end of the brake sleeve 60.

A pivotal lever 66, fulcrumed between its ends around a pin 68 has a depending yoke 70 that straddles sleeve 46 of clutch driven member 16 between flange 44 and dog ring 38. Yoke 70 has a bearing 72 at the end of each yoke arm to provide rolling contact with the side of flange 44 and the side of dog ring 38. One end 74 of lever 66 at its upper side (FIG. 1) contacts a spring-biased plunger switch 76 of a microswitch 78 connected to an electrical source of energy. The opposite end 80 of lever 66 at its upper side contacts a pin 82 of a pneumatic control unit 84.

The pneumatic control unit 84 has a casing 86 defining two closed volumes each having a respective piston 88 and 90, reciprocably and sealingly operable therein. One of the pistons 88 is reciprocable along a vertical axis while the other piston 90 is reciprocable along a horizontal axis, FIG. 1.

Piston 88 has a fluid pressure chamber 92 defined at one side thereof and a vented chamber 94 defined at its opposite side. Piston 88 is mounted coaxially about pin 82 and the latter extends both upwardly through pressure chamber 92 and slidably in sealing relation through a bore 96 formed in casing 86, and downwardly through vent chamber 94 and slidably through another bore 98 formed in casing 86 to contact the left end 80 of lever 66. Bore 96 interconnects the two volumes defined by casing 86.

Fluid pressure chamber 92 is charged with fluid through a pipe 100 connecting at one end to a port and passage 102 that opens to chamber 92. Pipe 100, at its opposite end, connects to a valve 103 having a positioning handle 104. Valve 103 is connected to a solenoid valve 105 by a pipe 106, and solenoid valve 105 is connected to a source of fluid under pressure, a reservoir 107, by a pipe 108. Solenoid valve 105 is energized by microswitch 78 connected to solenoid valve 105 by lead lines 110, and as noted, microswitch 78 has a spring-biased plunger switch 76 that contacts the right side of lever 66.

Valve 103, when handle 104 is positioned rightwardly as shown in FIG. 3 cuts off fluid flow from pipe 106 to pipe 100 and vents the latter, and when positioned leftwardly, broken line position shown, pipe 106 is connected to pipe 100 to permit flow of fluid therepast.

Piston 90, operable along a horizontal axis, has a fluid pressure chamber 114 defined at one side thereof and a vented chamber 116 at its opposite side. A stub shaft 118 projects axially from the vented side of piston 90 and extends at its free end 120 slidably into a bore 122 formed in casing 86 and opening into chamber 116. Shaft 118 has a flat surface or cut 124 adjacent its free end for engaging with the end of pin 82 of piston 88. Rotation of shaft 118 is restrained by a pin 125 that contacts a groove 126 formed on the periphery of shaft 118.

A recessed, cylindrical lock member 127 is slidably positioned in bore 122 and is biased toward the free end 120 of shaft 118 by a spring 128. Spring 128 is positioned in the recess of lock member 127 and extends outwardly therefrom into abutting contact with the wall of casing 86 defining the closed end of bore 122. Bore 122 is vented at its closed end via a vent port 130.

Piston 90 is normally biased to a rightwardmost position, FIG. 1, by a spring 132 surrounding shaft 118 and caged between piston 90 and a shoulder 134 formed in casing 86. Fluid pressure chamber 114 is charged with and vented of fluid through a port 136 connected to a source of air under pressure, reservoir 107, by a pipe 138. A valve 140 having a positioning handle 142 is interposed in pipe 138. Valve 140 when handle 142 is positioned rightwardly, FIG. 3, vents chamber 114 and cuts off flow of air under pressure from reservoir 107, and when positioned leftwardly permits pressurized air to flow therepast from reservoir 107 to chamber 114.

Chambers 94 and 116 are vented through vent ports 144 and 146, respectively, provided in casing 86.

The overload clutch device is illustrated in association with a textile roll 148 mounted on the end of shaft 2. If desired, another textile roll 148 may be mounted at the opposite end of shaft 2 which is shown threaded and capped. Normally, the right end 74 of lever 66 is in contact with plunger 76 of microswitch 78 and in a position permitting the microswitch plunger 76 to be biased to its lowermost position for deenergizing solenoid 105. Solenoid 105 is in a condition venting pipe 106 and cutting off flow of pressurized air from pipe 108 and reservoir 107.

The left end 80 of lever 66 is applying a force to the end of piston pin 82 to bias piston 88 to its uppermost position, FIG. 1, whereby the uppermost end of piston pin 82 projects upwardly into bore 122 in transverse intersecting relation. Slide member 127 is biased abuttingly against one side of pin 82, and piston 90 is biased to its rightwardmost position by spring 132 at which time the free end 120 of shaft 118 is spaced from the right side of pin 82 in bore 122. All of the chambers of the control device are vented and the handle positions, 104 and 142, of valves 103 and 140, respectively, are in the positions shown in FIG. 3. Valve 140 is venting chamber 114 and cutting off flow of pressurized air from reservoir 107, while valve 103 is venting pipe 100 leading to passage 102 of control valve 84 and cutting off flow of air from pipe 106.

Dog ring 38 of clutch driven member 16 is biased into meshing engagement with dog ring 30 of clutch drive member 12, and tapered surface 42 of clutch driven member 16 is pressed into frictional engagement with friction lining 20 of clutch drive member 12 by spring 48 applying a biasing force against flange 44.

Prior to operation a yarn 150 being processed is laced so that at least one wrap of yarn passes around roll 148. Valve handle 104 is moved leftwardly to the broken line position shown in FIG. 3, whereby valve 103 shuts off venting of pipe 100 and connects pipe 100 to pipe 106 to permit flow of pressurized air therepast.

Although air will not be vented from valve 103, pipe 100 and 106 will be in a vent condition via solenoid 105, at this time. In operation, motor 10 drives tubular shaft 4 and clutch drive member 12. Since dogs 32 of clutch driven member 16 are in meshing engagement with dogs 40 of dog ring 38, and frictional surface 42 and frictional lining 20 are engaged, clutch drive member 12 drives clutch driven member 16 and the latter in turn drives driven shaft 2 and roll 148.

Assume that yarn 150 laced around roll 148 because of an abnormal condition begins to ravel on roll 148 applying an added torque load on driven shaft 2. With the higher load transmitted, clutch dog ring 38 is forced to slip axially away from dog ring 30, against the bias force of spring 48. Dogs 40 will not slip completely out of engagement with dogs 32 and friction lining 20 will remain biased in engagement with friction surface 42.

Upon a predetermined displacement of clutch driven member 16 rightwardly, FIG. 1, responsively to a predetermined torque load applied to driven shaft 2 by the raveled yarn, yoke 70 is shifted or carried rightwardly causing lever 66 to pivot in a counterclockwise direction. The left end 80 of lever 66 will move downwardly permitting piston 88 to slide downwardly, while the right end 74 of lever 66 will be raised to push microswitch plunger 76 upwardly. When plunger 76 is depressed a predetermined distance, microswitch 78 energizes solenoid 105 causing air under pressure to flow to chamber 92 from reservoir 107 via pipes 108, 106, and 100. Responsively to the pressure of air in chamber 92, piston 88 is biased downwardly for carrying pin 82 downwardly causing lever 66 to be pivoted to a greater degree in a counterclockwise direction against the force of spring 48. As lever 66 rotates in a counterclockwise direction yoke 70 shifts or slides clutch driven member 16 rightwardly on driven shaft 2 to effect a complete disengagement of dogs 40 from dogs 32 and frictional surface 42 from friction lining 20, and to effect braking engagement of flange 44 with brake surface 64. Braked clutch driven member 16 applies a braking force to driven shaft 2 through the keyed connection therewith and stops or arrests textile roll 148.

Meanwhile, when piston 88 moved downwardly it carried the upper end of pin 82 downwardly out of bore 96 permitting spring 128 to actuate and slide lock member 127 rightwardly into contact with the free end 120 of shaft 118.

With driven shaft 2 and roll 148 braked, the yarn 150 raveled around textile roll 148 is removed. After the yarn 150 is restrung on roll 148, the operation is restarted as follows.

Handle 142 of valve 140 is turned leftwardly, FIG. 3, for charging chamber 114 with air under pressure from reservoir 107. The pressure of air delivered to chamber 114 causes piston 90 to move responsively leftwardly, FIG. 1, against the force of spring 132. Piston 90 carries shaft 118 leftwardly so that the free end 120 of shaft 118 contacts and shifts lock member 127 leftwardly against spring 128 to a point past bore 96. When piston 90 is biased to a leftwardmost position, the flat surface 124 on shaft 118 will be positioned over bore 96.

Handle 104 of valve 103 is now positioned rightwardly, FIG. 3, to vent pipe 100 and chamber 92 and to cut off flow of pressurized air from pipe 106 and solenoid valve 105. Responsively to the venting of chamber 92, spring 48 acts to rotate lever 66 in a clockwise direction and lever 66 carries pin 82 upwardly to cause the upper end of pin 82 to contact the flat surface 124 of shaft 118, thereby restraining further pivotal movement of lever 66. At this time friction surface 42 of clutch member 16 is in slipping engagement with friction lining 20 to provide an initial rotation to driven shaft 2 prior to positive clutch member 12 and 16 engagement.

When lever 66 rotated in a clockwise direction, the right end 74 of lever 66 lowered to permit plunger 76 of microswitch 78 to be biased downwardly to actuate or deenergize solenoid 105 to cut off flow of pressurized air from reservoir 107 and to vent pipe 106.

Handle 142 of valve 140 is now moved rightwardly to vent chamber 114 and to cut off flow of pressurized air from reservoir 107, whereby spring 132 biases piston 90 to its rightwardmost position. Piston 90 carries the free end 120 of shaft 118 out of contact from the upper end of pin 82 and releases or unlocks pin 82. Spring 48 acting on pin 82 now shifts clutch driven member 16 leftwardly, FIG. 1, to effect a positive clutching engagement of dogs 32 and dogs 40 and to shift yoke 70 leftwardly to cause lever 66 to raise piston 88 and pin 82 to their uppermost positions shown.

Handle 104 of valve 103 is repositioned leftwardly to shut off venting of pipe 100 and to permit a through-flow of fluid from solenoid 105 to pipe 100 upon an occurrence of another yarn ravel condition.

Although manual control of the pneumatic system is illustrated, it will be understood that a conventional electrical circuit may be applied to provide sequential relay switching of the manual control valves. It will be understood that the teeth or dogs on clutch rings 30 and 38 are tapered so that they will disengage at a predetermined torque load.

We claim:

1. An overload clutch device comprising in combination,
   a drive shaft having a clutch drive means mounted thereon,
   a driven shaft having a clutch driven means positioned thereon in fixed rotary and slidable axial relation,
   biasing means for biasing said clutch driven means into positive clutched relation with said clutch drive means to couple said drive and driven shafts,
   brake means for braking said clutch driven means and said driven shaft,
   lever means comprising a pivotal lever rotatably journaled to said clutch driven means,
   electropneumatic valve control means and power means connected to a source of fluid under pressure and engaging said pivotal lever,
   whereby said pivotal lever is rockable a predetermined distance in one direction by said clutch driven means responsively to an overload condition to actuate said electropneumatic valve control means and power means to apply a force to said pivotal lever to further rock the latter in said one direction to effect clutch disengagement and an engagement of said brake means with said clutch driven means.

2. An overload clutch device as in claim 1, wherein said electropneumatic valve control means and power means is positionable to release said force applied to said pivotal lever permitting rockable movement of the latter in the opposite direction by said biased clutch driven means while effecting a brake disengagement and an engagement of said clutch drive and driven means.

3. An overload clutch device comprising in combination,
   a first clutch means mounted on a drive shaft,
   a second clutch means mounted on a driven shaft,
   said first and second clutch means having engaging surfaces that sense a predetermined overload condition on the drive shaft and responsively separate,
   bias means for normally biasing said second clutch means into engagement with said first clutch means to drive said driven shaft,
   pivotal lever means journaled on said second clutch means,
   valve control means and power means slidably engaging said pivotal lever means,
   whereby upon said overload condition, said second clutch means displaces away from said first clutch means against the force of said bias means and pivots said pivotal lever means in one direction to energize said valve control means and power means which then acts to pivot said pivotal lever means an additional increment in said one direction to positively disengage said second clutch means from said first clutch means.

4. An overload clutch device as in claim 3, further comprising brake means for braking said clutch driven means and said driven shaft.

5. An overload clutch device as in claim 4, wherein said valve control means and power means operates to effect a sequential disengagement of said first and second clutch means and a braking of said second clutch means, and to effect a sequential release of said braked condition and an engagement of said first and second clutch means.

6. An overload clutch device as in claim 3, wherein said first and second clutch means include toothed and frictionally engaging members.

7. An overload clutch device as in claim 3, in which said valve control means is an electropneumatic control valve.

8. An overload clutch device as in claim 3, wherein said second clutch means is mounted on said driven shaft in fixed rotary and slidable axial relation therewith.

9. An overload clutch device as in claim 3, wherein said drive shaft has at least one textile roll mounted thereon.